Figure 1:
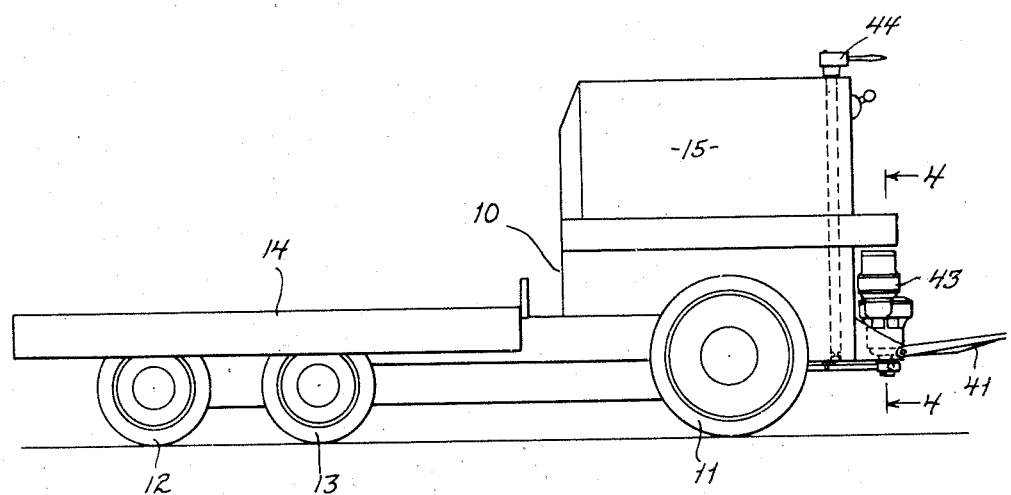

Feb. 18, 1941.   C. E. COCHRAN   2,232,165
POWER OPERATED STEERING MECHANISM
Filed Oct. 4, 1938   3 Sheets-Sheet 1

INVENTOR.
CLYDE E. COCHRAN
BY Bates, Golrick & Teare
ATTORNEYS

Feb. 18, 1941.  C. E. COCHRAN  2,232,165
POWER OPERATED STEERING MECHANISM
Filed Oct. 4, 1938  3 Sheets-Sheet 3
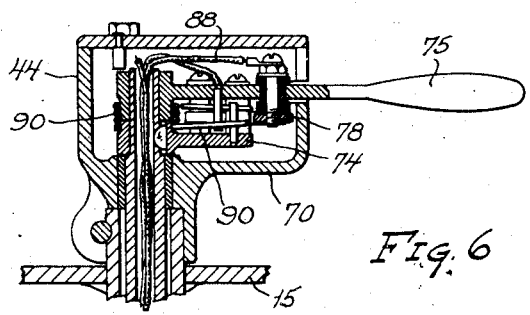
Fig. 6
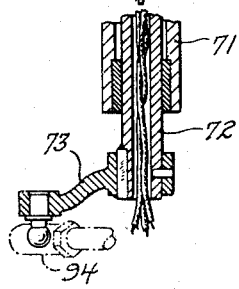
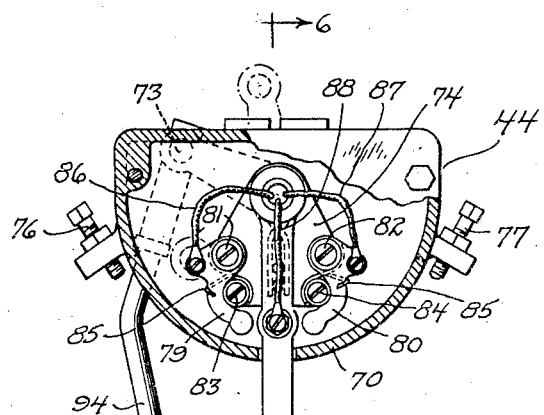
Fig. 5
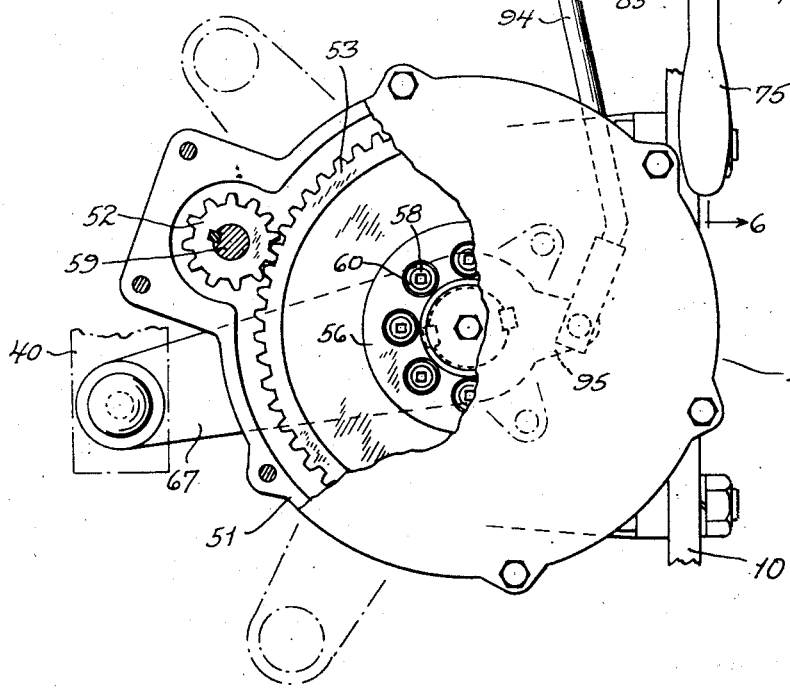
INVENTOR.
CLYDE E. COCHRAN
BY Bates, Goldrick & Teare
ATTORNEYS Patented Feb. 18, 1941

2,232,165

UNITED STATES PATENT OFFICE 2,232,165

POWER OPERATED STEERING MECHANISM

Clyde E. Cochran, Cleveland, Ohio, assignor to The Elwell-Parker Electric Company, Cleveland, Ohio, a corporation of Ohio Application October 4, 1938, Serial No. 233,221

12 Claims. (Cl. 180—79.1)

The present invention is directed to power-operated steering mechanisms, and has for its general object the provision of a device which will be responsive quickly to the desires of the operator in the maneuvering of vehicles.

Another object of the present invention is the provision of a power-operated steering mechanism, which is adaptable to trucks of the industrial type.

A still further object of the present invention is the provision of a power-operated steering mechanism, to be used on so-called heavy industrial trucks, wherein considerable steering force is required to maneuver the trucks when loaded and when in confined traction spaces.

A still further object of the present invention is the provision of an electrically powered vehicle steering mechanism wherein the electrical control is mechanically responsive to and dependent upon the dirigible motions of the mechanical steering mechanism of the vehicle.

Other objects of the present invention will become obvious from the description hereinafter set forth and which refers in general to the mechanism disclosed in the drawings and which mechanism shows a preferred form of the invention.

Figure 2:
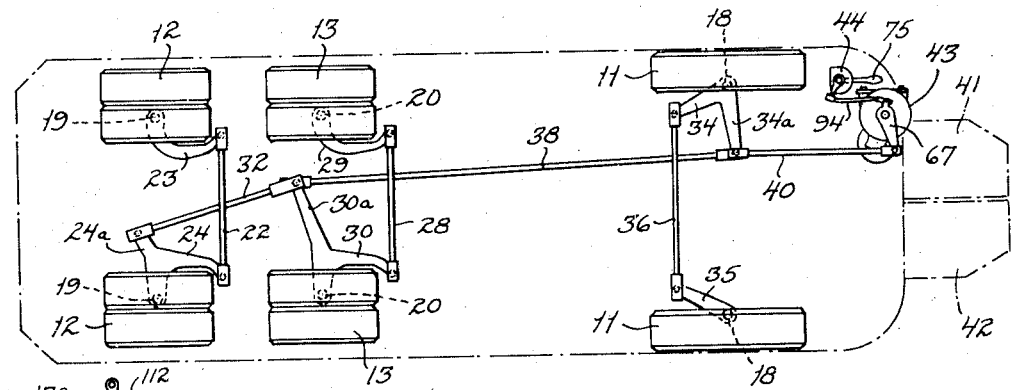
Figure 3:
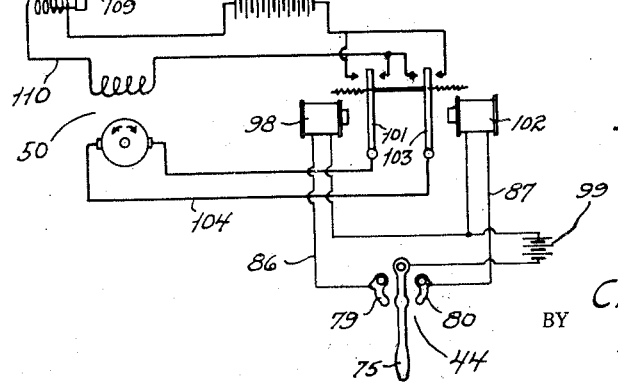
Figure 4:
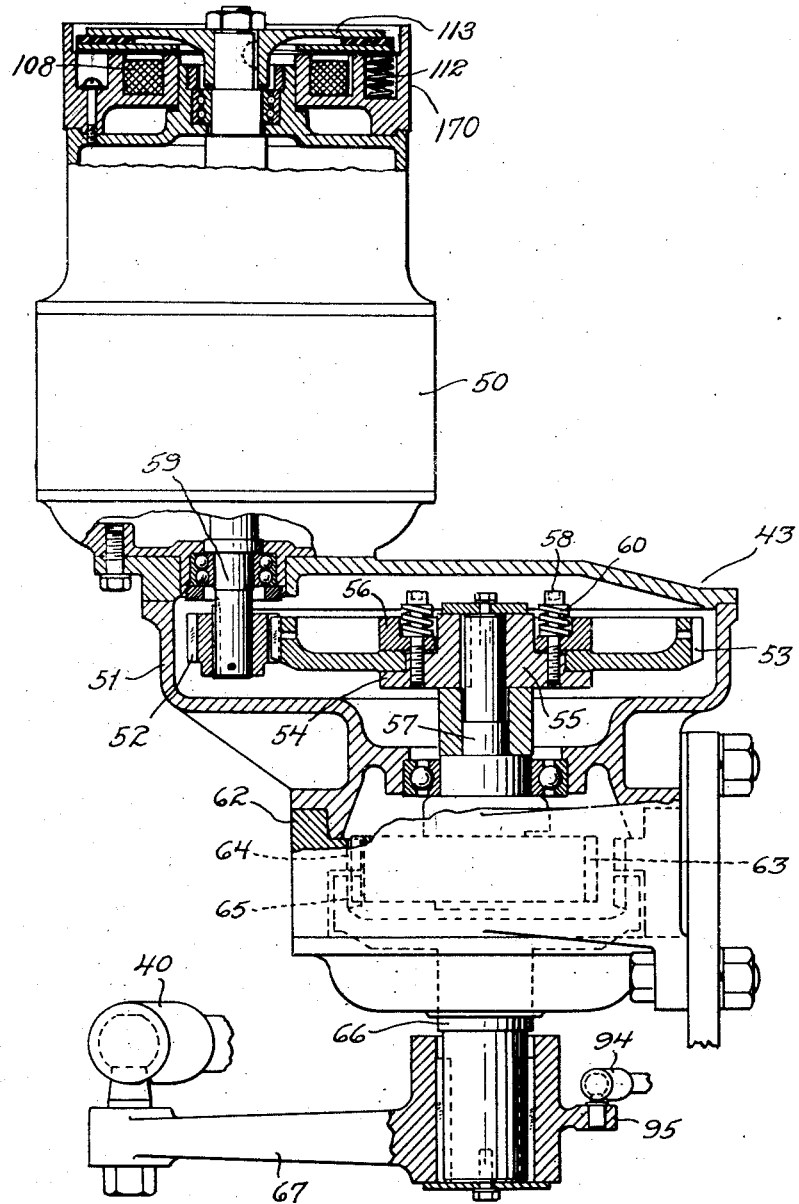

In the drawings, Fig. 1 is a side elevation of a heavy duty industrial truck of the platform lift type, equipped with my invention; Fig. 2 is a bottom plan view of the truck shown in Fig. 1; Fig. 3 is a circuit diagram; Fig. 4 is an enlarged cross-sectional view of the power unit of the steering mechanism, partly shown in cross-section along the line 4—4 of Fig. 1; Fig. 5 is a top plan view, shown partly in cross-section and illustrating the mechanical relationship of the controller mechanism to the power unit; and Fig. 6 is a cross-sectional elevation of the controller staff taken substantially along the line 6—6 of Fig. 5.

The present invention contemplates the arrangement of a power-driven mechanism for operating the steering mechanism of heavy duty vehicles, such as tractors, industrial trucks and the like, where steering has required the use of reduction gearing of such high ratios that manual manipulation of the steering wheel or lever becomes so awkward that the maneuvering efficiency of the vehicle is greatly decreased. I have illustrated the invention as being designed and adapted to heavy duty industrial trucks, but it will be understood by those skilled in the art that the invention is adaptable to the steering of other vehicles where like difficulties are encountered.

Industrial trucks usually have from four to six wheels, and these wheels are arranged upon steering knuckles, all of which are interconnected by steering bars and links, whereby the wheels may have very short turning radii and the turning radii of all of the wheels converge to so-called "common turning points." Quick maneuvering about short-turning radii is one of the requirements of an industrial truck, and when such trucks have a heavy load capacity of say from five to ten tons, the operator thereof encounters difficulty in maneuvering the same, and particularly when the truck is travelling over rough pavements.

In accordance with the present invention, I provide an electric motor which is suitably connected to the steering mechanism through reduction gearing mechanism having a high ratio of reduction, and I interpose between the motor and the steering mechanism a slip clutch, whereby the motor may not be over-powered. One of the features of the invention is a controller arrangement which takes the place of the usual steering wheel or lever, and which is mechanically connected to the steering mechanism of the truck, so that the controller mechanism mechanically follows the steering movements of the steering mechanism of the truck during such periods as the steering motor is in operation. The arrangement is such that the operator is required to exert only sufficient manual effort to move a lever with enough force to follow the movements of the controller and thus maintain a circuit closed which effects the connection of the steering motor to a source of power, and these features will be more fully disclosed in connection with the following description which refers to the mechanism illustrated in the drawings.

In Figs. 1 and 2 of the drawings I show an industrial truck 10 equipped with a pair of dirigible driving wheels 11 and two pairs of smaller load-bearing wheels 12 and 13, disposed beneath the load-lifting platform 14 of the truck. The particular truck illustrated is powered by a set of batteries within the housing 15, although it is to be understood the present invention is adaptable to use on trucks having gas engines, electrical generator power units. The traction wheels 11 are mounted upon steering knuckles generally indicated at 18, and each of the load wheels 12 and 13 are mounted upon steering knuckles 19 and 20. (See Fig. 2.) A cross-link 32 connects the two steering levers 23 and 24 of the wheels 12 and a similar cross-link 28 connects the steering levers 29 and 30 of the wheels 13. The lever 24 has an arm 24a and the lever 30 has an arm 30a which are connected by a steering link 32. The driving wheels 11 have similar steering levers 34 and 35 connected by a cross-link 36, and the steering lever 34 has an arm 34a which is connected to the arm 30a by a longitudinally extending link 38. The arm 34a is connected to the power unit of the steering mechanism by a link 40, as will be described.

Trucks of the type herein illustrated usually have the operator's platform disposed at one end of the truck and in the present illustration the platform is illustrated as comprising two platform members 41 and 42, which have limited pedal movements, which movements are utilized to operate certain mechanisms of the truck, such, for example, as a brake and a safety throw-out switch. Immediately adjacent the driver's position the power drive for the steering mechanism is placed and is generally indicated by the reference numeral 43, in Fig. 1. The controller mechanism for the power steer mechanism is generally indicated at 44 in Fig. 1.

The power unit proper comprises a reversible motor, an automatic brake for the motor, a slip clutch and a high ratio reduction gear mechanism, generally illustrated in Fig. 4. In Fig. 4 the motor 50 is illustrated as being vertically disposed and secured to the clutch casing 51 with the armature shaft 59 thereof extending into the clutch casing. A motor pinion 52 drives a gear member 53 and the gear member 53 is held in frictional engagement between a flange 54 formed on a hub member 55, and a spring pressed ring 56. The hub member 55 carries a plurality of stud members 58, which extend through the ring 56 and the ring is counterbored to receive the spring members 60, which are held in compressed relation against the ring member 56 in any suitable manner. A gear shaft 57 carrying hub member 54 and gear 53 extends downwardly into a gear housing 62. The lower end of the shaft 57 is eccentric and carries a free-running gear 63 thereon and the gear 63 meshes with a fixed internal gear 64. The eccentrically driven gear also meshes with an internal gear member 65, the latter gear being rotatable and fixed to a depending steering stud 66, to which is keyed or otherwise suitably secured a steering arm 67 which is pivotally attached to the steering link 40. The gear 65 has one tooth less than the gear 64.

It is desirable that the motor 50 be overpowered to meet any unusual steering conditions, and by interposing the slip clutch between the motor and the reduction gearing the hazard of disrupting the mechanism driven by the motor is avoided.

The motor 50 is reversible in a manner to be hereinafter described, and is equipped with a magnetic brake, generally indicated at 170, which is energized only when the motor is energized, thus releasing a brake mechanism that is immediately effective to arrest turning movements of the motor armature. Such brakes usually comprise a brake drum 113 (see Fig. 3) and a brakeshoe 108 or brake shoes acting upon the drum by spring influence 112 when the spring action is not opposed by an energized solenoid.

The controller mechanism 44 is devised in such a manner that its manual operation will correspond to a manual steering of the vehicle with a steering lever. The arrangement is such that the motor will continue to be energized to drive the steering mechanism in either direction just as long as the operator continues to exert a shifting pressure upon the manually operated lever of the controller. Should the operator remove his hand from the controller lever, the lever will return to a neutral position, and the steering mechanism will remain at whatever steering position thereof has been reached at the time the manual lever was permitted to return to a neutral position. Should the operator shift the manually operated controller lever to a reverse position, the motor will be reversed and the steering mechanism will be brought to a straight-ahead position, or if desired, continued operation of the power drive will cause the vehicle to be steered in an opposite direction.

To accomplish the foregoing operation in very short intervals of time, I have mechanically connected the controller mechanism to the steering mechanism whereby a controller element carrying certain electrical contacts will be caused to follow the steering movement of the steering mechanism.

In Figs. 5 and 6 I show a controller box 70, which may be secured to the vehicle in any suitable manner and in such position that part of the controller mechanism can be mechanically connected to the steering mechanism while being conveniently located at the operator's position on the truck. The controller box 70 has depending therefrom a tubular member 71, which comprises a bearing support for an interiorally disposed turnable tubular member 72. The tubular member 72 extends downwardly to a position adjacent to or below the platform members 41 and 42, and has mounted upon the lower end thereof a lever member 73 for a purpose to be presently described. Near the upper end of the tubular member 72 and secured thereto is a contact-carrying segment 74. Swingably mounted upon the upper end of the tube 72 immediately above the contact segment 74, is a manually operated controller lever 75, which is swingable through an arc of more than ninety degrees. Adjustable stop screws 76 and 77 are mounted upon the exterior of the controller box 70, to limit the maximum swing of the controller lever 75 in either direction from its central position, which position is illustrated in Fig. 5. An insulated contact member 78 is mounted upon the underside of the controller lever 75 and when the controller lever is swung in either direction the contact member 78 is brought into electrical contact with either the contact member 79 or the contact member 80, both of which are pivotally mounted upon the contact segment 74. The contact members 79 and 80 are pivotally mounted upon studs 81 and 82, respectively. Stop plugs 83 and 84 serve to position the contacts 79 and 80 in spaced-apart relation, and spring members 85 tend to urge the contact fingers toward each other and toward the central position of the controller lever contact.

Lead wires 86 and 87 are suitably connected to the contact fingers 79 and 80, respectively, and extend from the controller housing 70 downwardly within the turnable tube 72 to the motor controls which will be described presently. The lead wire 88 is suitably attached to the contact on the controller lever 75 and likewise extends downwardly through the turnable tube 72. A spring member 90 serves to maintain the controller lever 75 in a neutral position relative to the two contact fingers 79 and 80, at such times as the operator is not manipulating the lever.

As stated, the contact segment 74 is mechanically connected to the steering mechanism, whereby this segment is caused to positively shift during each shifting movement of the steering mechanism, and this connection is afforded by a link member 94 attached at one end to the arm 73 which is secured to the lower end of the tubular member 72 and is attached at the other end thereof to a small arm 95 formed on the main steering arm 67. Thus, when the operator shifts the controller lever 75 to make contact with either the contact finger 79 or 80, the steering mechanism is set in motion and the segment 74 is caused to follow the steering movement of the steering mechanism, and the motor will continue to change the position of the elements comprising the steering mechanism as long as the operator maintains contact between the controller lever contact 78 and with either one of the contact fingers 79 or 80, until such time as the controller lever abuts one of the stop screws 76 or 77, whereupon a slight further operation of the steering mechanism by the motor will cause separation of the controller lever contact and the contact finger on the segment 74.

By having the contact fingers 79 and 80 yieldingly mounted, the operator experiences no difficulties in maintaining a control circuit closed when the truck is travelling over rough pavements and the controller is subjected to considerable vibration.

The complete electrical hook-up is diagrammatically illustrated in Fig. 3, and will now be described. The lead wire 86 extends to a solenoid 98 which operates the switch members 101 and 103. The lead wire 87 extends to a solenoid 102, which operates switch members 101 and 103. The switch members 101 and 103 are connected into the motor armature circuit 104. A source of power for the solenoid circuit is indicated by the reference numeral 99 and a source of power for the motor, brake, etc. is indicated by the reference numeral 100. The solenoid 108 for operating brake shoe 109 is shown as being connected in the field circuit 110 of the motor, and when circuit 110 is not energized a spring member 112 serves to cause the brake shoe to bear upon the brake drum 113, carried by the motor shaft. By shifting the controller lever 75 either to the right or to the left, the motor circuit is closed through the solenoid-operated switch members 101 and 103, and the motor will be driven in the desired direction.

The device disclosed herein is immediately responsive to the operator's desires in maneuvering the truck, and the fatigue incident to the operation of manually powered steering mechanisms is eliminated.

It is further apparent that the position of the steering lever is always indicative of the direction in which the wheels of the truck have been turned. This is particularly important where the truck has been stopped, and where the character of the loading is such that the position of the wheels is not known to the operator when service is again resumed.

I claim:

1. A power-driven steering device adaptable to trucks of the industrial type, comprising a manually shiftable contact lever, mechanically inoperative to steer the steering mechanism of the truck, means carrying electrical contacts adapted to be shifted relative to said shiftable lever, a motor and circuit therefor, a source of power adapted to be connected to the motor through a shifting of said lever relative to the contacts on said contact-carrying means, means driven by said motor and connected to the steering mechanism of a vehicle by an oscillatable arm and a second oscillatable arm connecting said last-named means and the means carrying said contacts, whereby the movement of said contact-carrying member will be simultaneous relative to the dirigible movement of the steering mechanism of the vehicle when the device is installed thereon.

2. A power-driven steering device adaptable to vehicles, comprising a shiftable contact lever, means carrying a pair of electrical contacts adapted to be shifted relative to said shiftable lever, a circuit including a contact on the lever and the last two-named contacts, a motor, a source of power adapted to be connected to the motor to be driven in either direction through a selective shifting of said lever relative to said contact-carrying means, said lever being mechanically inoperative to steer the vehicle, means driven by said motor and connectable to the steering mechanism of a vehicle by an oscillatable means and means driven by said last-named means and mechanically connected to the shiftable contact carrying means, whereby the movement of said shiftable contact member will be simultaneous relative to the dirigible movement of the steering mechanism of a vehicle.

3. In an industrial truck, the combination of a plurality of pairs of dirigible wheels, steering mechanism connecting the respective wheels whereby the wheels may be steered in unison upon operation of the steering mechanism, a power-driven mechanism connected to the steering mechanism of the truck and manually controlled from the operator's position upon the truck, including an electric motor, a source of power therefor, an electric circuit adapted to connect the motor to the source of power and means connecting the motor to the steering mechanism to power-operate the steering mechanism, an angularly shiftable contact-carrying member and a manually shiftable lever associated therewith and carrying a contact, said lever being mechanically inoperative to steer the steering mechanism, all of said contacts being connected into said motor circuit, and means connecting the steering mechanism to the contact-carrying member to cause said contact-carrying member to be moved in unison with the movement of the steering mechanism.

4. In an industrial truck, the combination of a steering mechanism adapted to steer the wheels of the truck in unison, a power-driven mechanism connected to the steering mechanism of the truck by a link and oscillatable arm, said power-driven mechanism including a motor, a gear reduction means, a slip clutch mechanically interposed between the motor and the gear reduction means, an electrical circuit adapted to connect the motor to a source of power, manually operated means for controlling said circuit and means associated with said oscillatable arm and the manually operated means for breaking said circuit.

5. In an industrial truck, the combination of a steering mechanism adapted to steer the wheels of the truck in unison, a power-driven mechanism for operating the steering mechanism of the truck, said power-driven mechanism including a motor, means connecting the motor to the steering mechanism of the truck to power-operate the steering mechanism, an electrical circuit adapted to connect the motor to a source of power, a follower-controller for closing and opening said circuit at any operable position of the steering mechanism of the truck, including a manually operated lever which is mechanically inoperative to steer the steering mechanism, and means mechanically connected to the steering mechanism of the truck for causing said controller to be moved simultaneously with the movements of the steering mechanism.

6. In an industrial truck, the combination of a steering mechanism adapted to steer the wheels of the truck in unison, a power-driven mechanism for operating the steering mechanism of the truck, said power-driven mechanism including a reversible motor, means connecting the motor to the steering mechanism of the truck to power-operate the steering mechanism, an electrical circuit adapted to connect the motor to a source of power, a follower controller for closing and opening said circuit at any operable position of the steering mechanism of the truck and also operable to reverse the motor, including a manually operated lever which is mechanically inoperative to steer the steering mechanism, and means operated with the steering mechanism of the truck for causing said controller to be moved simultaneously with the movements of the steering mechanism.

7. In an industrial truck, the combination of a plurality of pairs of dirigible wheels, steering mechanism connecting the respective wheels whereby the wheels may be steered in unison upon operation of the steering mechanism, a power-driven mechanism connected to the steering mechanism of the truck and manually controlled from the operator's position upon the truck including an electric motor and motor brake, a source of power therefor, an electric circuit adapted to connect the motor to the source of power and means connecting the motor to the steering mechanism to power-operate the steering mechanism, including a slip clutch and reduction gearing, an angularly shiftable contact-carrying member carrying two contacts, a manually shiftable lever associated therewith and carrying a contact, said contact carrying members being mechanically inoperative to steer the steering mechanism and all of said contacts being connected into said motor circuit, whereby the motor may be started, stopped and reversed at any position of the said wheels and said brake be operated upon each such operation of the motor, and means operated with the steering mechanism to cause said contact-carrying member to be moved simultaneously with the movement of the steering mechanism.

8. In an industrial truck the combination of a plurality of dirigible wheels, a manually shiftable circuit closing member, a motor and a source of power, a steering mechanism connecting to the wheels of the truck, a power driven mechanism for operating the steering mechanism from the motor, a circuit adapted to connect the motor to the source of power upon manual operation of the shiftable member in either direction, a pair of shiftable contacts associated with said shiftable circuit closing member, a controller housing rigidly fixed to the truck, a turnable post supported within the housing remote from the steering mechanism, link and lever means connected to the steering mechanism for shifting said pair of contacts and post angularly and in synchronism with the dirigible shifting of said vehicle steering mechanism when the motor is in operation, said circuit closing member being shiftable to close the circuit independently of the movement of the post.

9. A power-driven steering device in combination with the steering mechanism of a truck of the industrial type, comprising a manually shiftable contact lever, an upright turnable post carrying electrical contacts adapted to be shifted relative to said shiftable lever, a fixed controller housing for the lever and said contacts and supporting said post, a motor and circuit therefor, a source of power adapted to be connected to the motor through a shifting of said lever relative to said contact-carrying post, a gear reduction means driven by said motor and connected to the steering mechanism of the vehicle and lever means connecting said gear reduction means and the shiftable contact carrying post, whereby the movement of said shiftable contact member will be angularly synchronized relative to the dirigible movement of the steering mechanism of a vehicle when said device is operatively connected thereto.

10. In an industrial truck, the combination of a steering mechanism adapted to steer multiple pairs of wheels of the truck in unison, a power-driven mechanism for operating the steering mechanism of the truck, said power-driven mechanism including a motor, a gear reduction means connecting the motor to the steering mechanism of the truck including a slip clutch, mechanically interposed between the motor and the gear reduction means, an electrical circuit adapted to connect the motor to a source of power, a manually-operated hand lever for controlling said circuit and a controller mechanism comprising an upright turnable post carrying contacts connected into said circuit, a controller housing fixed to the truck and housing said contacts and adaptable to turnably support said post and means for turning said post in unison with the steering mechanism comprising lever and link means connecting the post and the gear reduction means.

11. In an industrial truck, the combination of a plurality of pairs of dirigible wheels, steering mechanism connecting the respective wheels whereby the same may be steered in unison upon operation of the steering mechanism, a power-driven mechanism connected to the steering mechanism of the truck and manually controlled from the operator's position upon the truck, including an electric motor, a source of power therefor, an electric circuit adapted to connect the motor to the source of power, gear reduction means connecting the motor to the steering mechanism to power-operate the steering mechanism, a manually operated means for controlling the circuit, a vertically extending turnable controller member adapted to be operated in unison with the steering mechanism and contacts on the turnable controller member cooperating with said manually operated means for completing the circuit, said motor and gear reduction means being disposed in the combination intermediate the turnable controller member and the truck steering mechanism and means connecting the gear reduction means to the turnable controller member.

12. In an industrial truck, the combination of a steering mechanism adapted to steer the wheels of the truck in unison, a power-driven mechanism for operating the steering mechanism of the truck, said power-driven mechanism including a motor, means connecting the motor to the steering mechanism of the truck to power-operate the steering mechanism, including speed reduction gear mechanism, an electrical circuit adapted to connect the motor to a source of power, a brake on the motor, a follower controller for closing and opening said circuit at any operable position of the steering mechanism of the truck, means mechanically connected to the steering mechanism of the truck for causing said controller to be moved simultaneously with the movements of the steering mechanism and means fixed relative to the truck for limiting the range of switch closing operation of the follower controller.

CLYDE E. COCHRAN.